United States Patent

Burgarella

[15] 3,659,509
[45] May 2, 1972

[54] EXPOSURE CONTROL SYSTEM WITH AUTOMATIC ADJUSTMENT FOR FLASH SYNCHRONIZATION

[72] Inventor: John P. Burgarella, Sudbury, Mass.

[73] Assignee: Polaroid Corporation, Cambridge, Mass.

[22] Filed: July 24, 1969

[21] Appl. No.: 844,501

[52] U.S. Cl..................95/11.5 R, 95/10 CT, 95/53 EA, 95/64 A, 95/64 D
[51] Int. Cl. .........................................................G03b 9/70
[58] Field of Search................95/10 C, 11.5, 53, 60, 64 A, 95/64 D

[56] References Cited

UNITED STATES PATENTS

| | | | |
|---|---|---|---|
| 2,621,570 | 12/1952 | Kesel et al. | 95/60 |
| 3,200,723 | 8/1965 | Topaz | 95/11.5 |
| 3,205,803 | 9/1965 | Burgarella | 95/53 |
| 3,348,460 | 10/1967 | Schmitt | 95/10 C |
| 3,397,629 | 8/1968 | Mori | 95/10 C |
| 3,464,332 | 9/1969 | Davidson et al. | 95/10 C |
| 3,522,765 | 8/1970 | Johnson et al. | 95/60 |

Primary Examiner—Samuel S. Matthews
Assistant Examiner—Michael L. Gellner
Attorney—Brown & Mikulka, William D. Roberson and Gerald L. Smith

[57] ABSTRACT

An exposure control system incorporating an improved flash synchronization arrangement. The timing of the initiation of flash illumination relative to an exposure interval is controlled to substantially equate the quantity of scene light entering the aperture of a photographic apparatus during an exposure interval initiating period with the quantity of light entering the aperture during the corresponding period required for terminating an exposure interval. In a preferred embodiment the dynamic characteristics of a flash lamp are adjusted by follow-focus means to normalize the amount of light reaching the film plane of a camera.

14 Claims, 7 Drawing Figures

Patented May 2, 1972

INVENTOR.
JOHN P. BURGARELLA
BY Brown and Mikulka
and
Gerald L. Smith
ATTORNEYS

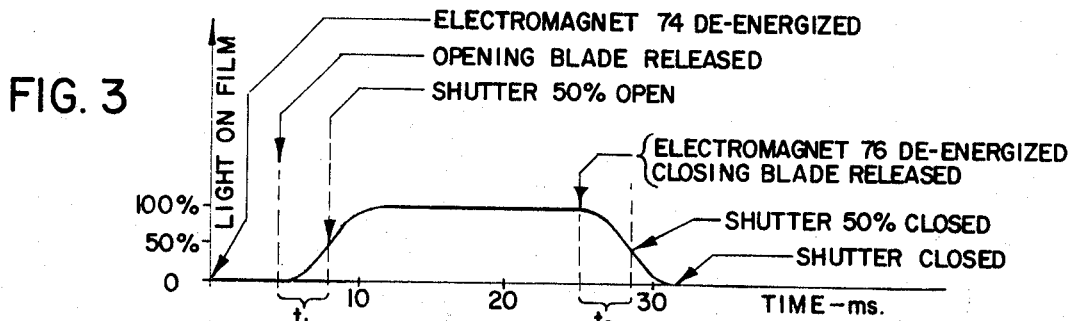
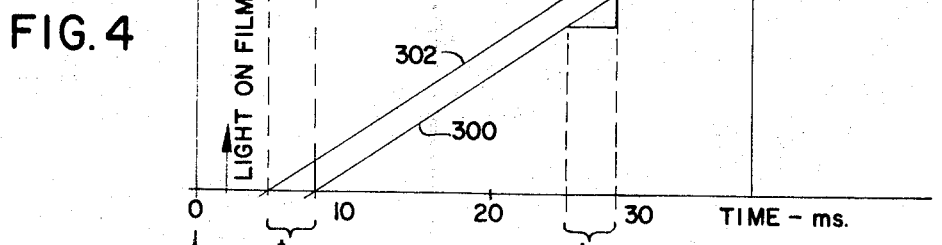
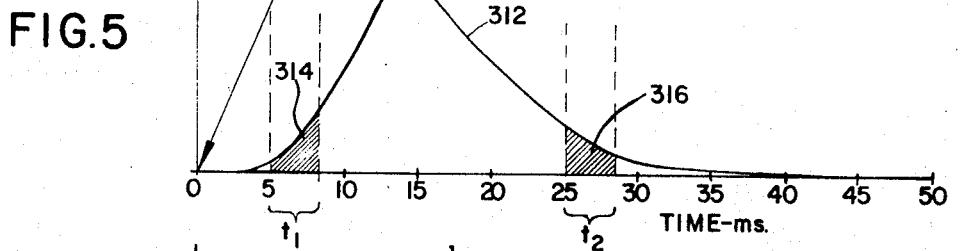
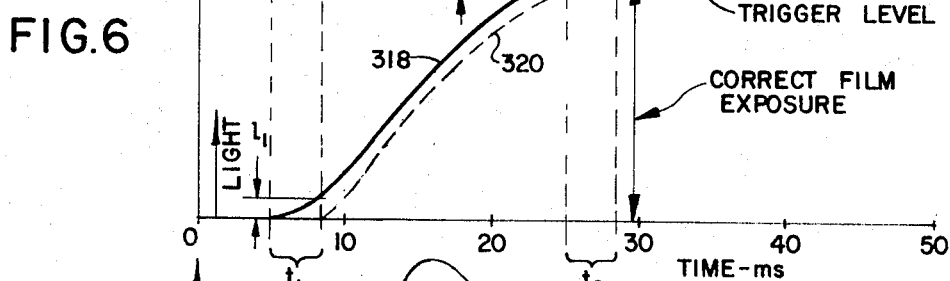
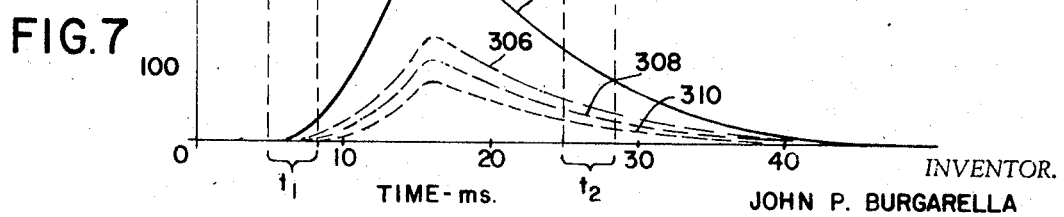

3,659,509

EXPOSURE CONTROL SYSTEM WITH AUTOMATIC ADJUSTMENT FOR FLASH SYNCHRONIZATION

The present invention relates to exposure control systems for photographic apparatus and, more particularly, to the operation of electronic exposure control systems with transient scene illumination.

BACKGROUND OF THE INVENTION

Automatic exposure control systems for photographic devices basically evaluate scene brightness or levels of illumination, weight this evaluation with respect to the sensitometric characteristics of a film being exposed and regulate one or more variable exposure control parameters such as exposure interval or aperture size in correspondence with the weighted evaluation. Scene brightness evaluation for the systems is performed with light measuring circuits utilizing one or move photosensitive elements. The elements are aligned to be responsive to the light characteristics of a scene somewhat coincident with the field of view of an objective or taking lens system.

By necessity, the control systems include both mechanical as well as electronic components. These components are functionally coupled at one or more electrical-mechanical interfaces which are designed so that the mechanisms may react to regulate scene light in response to an electrical event. Generally, this electrical event is present as a change in the energization level or status of an electromagnet. The mechanical component of the interface includes one or more spring loaded shutter or aperture actuator elements arranged for release and dynamic response to the change.

In order for the control systems to achieve requisite accuracies in the regulation of exposure parameters, the control mechanism must have a reliable and repeatable dynamic response. For instance, where exposure interval is to be automatically controlled, the mechanism must first uncover a preselected exposure aperture and, following an interval of exposure determined by a light sensitive circuit, react to cover the aperture. Inasmuch as dynamic delays are occasioned in the period required for initially opening the shutter and in the period required for causing the exposure mechanism to terminate an exposure, the control system must be designed to accommodate and compensate for the amount of light entering the aperture during these terminal periods. This compensation is conventionally provided by adjusting the closing characteristic of the shutter mechanism to be equivalent to its opening characteristic. As a consequence, the real timing of the shutter interval between opening and closing of the shutter lags the timing of exposure interval derived within the light sensing circuit of the system. Under constant scene illumination conditions, because of the symmetry of the dynamic response occasioned at the initiation and termination of an exposure, the timed electronic interval is substantially equal to the interval of photographic exposure.

This symmetry at the termini of an exposure interval is disrupted where transient as opposed to constant or steady state light levels are encountered. Under transient scene illumination as derived from flashbulbs and the like, the light levels witnessed by the exposure mechanism during the initiation of an exposure interval usually will be different from the light levels witnessed during an equivalent exposure termination period. As a result, the symmetry of the exposure program realized with steady state illumination is no longer present.

SUMMARY OF THE INVENTION

The present invention is addressed to automatic exposure control systems evidencing an accurate photo-responsive control under conditions of both steady state and transient levels of scene lighting. This accuracy is achieved while maintaining the same dynamic responsiveness of the exposure mechanism to the initiation and termination of exposure in both steady state and transient illumination conditions. The system is capable of retaining this desirable symmetry by providing, inter alia, a normalization of the light available for exposure of a photosensitive media during flash illuminated photographic procedures. In addition to this normalization of available light, the system functions to effect an adjustment in the timed output characteristic of a flashbulb or similar generator of transient illumination as it relates to the timed operation of a light sensitive circuit. This adjustment is predetermined in accordance with the duration and levels of light anticipated from the scene being artificially illuminated.

In a preferred embodiment, the control system of the invention incorporates a follow-focus aperture adjustment means to provide the above-described light normalization. In addition to such adjustment, the energization of a flash-type light source is timed in correspondence with the operational characteristics of the light sensitive control circuit of the invention. The timing of the initiation of flash illumination relative to the exposure interval is controlled to substantially equate the quantity of scene light entering the aperture of the photographic apparatus during an exposure interval initiating period with the quantity of light entering the aperture during the corresponding period required for terminating the exposure interval.

A further feature and object of the invention is to provide an improved shutter control system which is capable enhancing proper exposure under transient light conditions such as those created during the operation of flashbulbs and the like.

Another feature and object of the invention is to provide an exposure control system characterized in having a symmetrical dynamic response at the commencement and termination of an exposure interval and which provides for the energization of a flashbulb during transient illumination operation substantially at the commencement of exposure interval regulation.

Another aspect of the control system of the invention resides in providing an electromechanical fully automatic exposure interval control system incorporating means for igniting a flash illuminating apparatus in response to a change in the energization level of an electromagnet occurring at the commencement of an exposure interval.

The invention accordingly comprises the system, apparatus and method processing the features, technique and properties which are exemplified in the description to follow hereinafter and the scope of the invention is indicated in the appended claims.

BRIEF DESCRIPTION OF THE DRAWINGS

FIG. 3 is an expanded-time scale diagram illustrating the dynamic characteristics of a shutter mechanism illustrated in FIG. 1;

FIG. 4 is a chart showing a time scale comparison between integrated light values derived from the shutter mechanism of FIG. 1 with electrical signal generation derived in the control circuit of FIG. 2;

FIG. 5 is a graph of the instantaneous light output characteristics of a conventional flashbulb;

FIG. 6 is a chart illustrating the integrated light values witnessed at a photographic film plane and at the photocell of an exposure control system; and FIG. 7 illustrates a family of curves showing the instantaneous amount of light witnessed at the film plane through a fixed aperture of a camera from a photographic flashbulb light source.

DETAILED DESCRIPTION OF THE DRAWINGS

The conformance of an exposure control system to equivalent operation under both steady state and artificially generated transient light conditions is achieved by a normalization of the light permitted to enter the optical path of a camera in conjunction with a time shifting form of control over one exposure parameter as it relates to the timed energization of a source of transient illumination. Normalization of light permitted to pass through a photographic aperture is preferably derived through a "follow-focus" form of regulation wherein the relative aperture selected for any flash illuminated exposure is determined on a flash source-to-subject distance. This approach fundamentally is based upon an application of the inverse square law for light energy propagation. Under the law, light energy available from a given source is considered to vary inversely with the square of the distance from that source. For any given source of transient illumination the amount of light anticipated to be available for an exposure may be predetermined and an aperture mechanism preselected accordingly. The system of the invention is depicted in the accompanying drawings incorporated within an exposure control arrangement which is operative to automatically regulate both relative aperture and exposure interval in accordance with scene lighting. These parameters are sequentially regulated, the system operating first in an aperture-determining mode and then in a shutter-timing mode.

Figure 1:
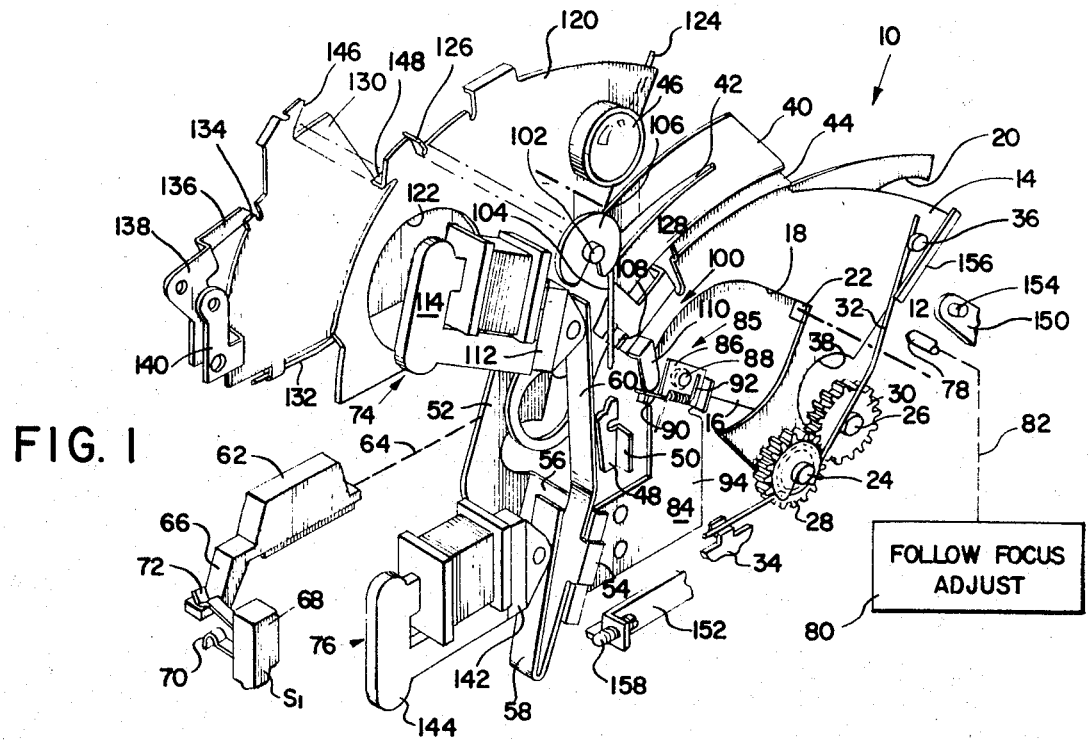
FIG. 1 is a pictoral representation of a control mechanism operable under the system of the invention, sharing components of the mechanism in exploded fashion.

Referring to FIG. 1, a control mechanism for sequentially regulating effective aperture and exposure interval is illustrated generally at 10. The components of mechanism 10 are illustrated in a pre-exposure orientation, certain of its elements being cocked in readiness for exposure. Aperture adjustment about the axis 12 of the optical path of the photographic apparatus within which the regulating mechanism is mounted is provided by a diaphragm arrangement having two aperture defining blades or elements 14 and 16. Formed of planar, opaque material, each of the blades 14 and 16 is configured having selectively contoured indentations or notches, the edges of which are shown respectively at 18 and 20. The notches within each of the aperture blades are shaped and arranged so as to cooperate when overlapped to define continuously tinuously variable aperture openings, as indicated at 22, which are formed about the axis 12. Blades 14 and 16 are mounted for rotation at pivot studs, respectively shown at 24 and 26.

To provide a coaction between each of the aperture blades, externally meshing spur gears 28 and 30 are journaled respectively over the shafts of studs 24 and 26 and fixed to blades 14 and 16. The spur gears 28 and 30 permit a uniform synchronous and relative coaction between aperture blades 14 and 16. Inasmuch as the aperture blades are linked for mutually opposed rotation through gears 28 and 30, only one of the blades need be driven to impart rotation to both. Accordingly, a singular wire blade loading spring 32 is mounted within the assembly to bias the blades for oppositely directed pivotal movement. Spring 32 is slideably wound about pivot stud 24 and includes a stationary end fixed to a tab 34 extending from a supporting base. The flexed transitional end of spring 32 is positioned in biasing relationship against an aperture spring stud 36 secured to the surface of blade 14. Rotational force exerted by spring 32 against blade 14 serves to impose a corresponding oppositely directed rotational force upon blade 16 through the geared mechanical linkage between the blades. In the initial or cocked position of the blades depicted, a minimum aperture 22 which the blades are called upon to define is present. Semicircular notches such as that shown at 38 in blade 14 are provided to permit the blades to rotate to positions permitting larger aperture areas.

A further examination of the shape of aperture blade 14 reveals an outwardly extending flange portion or vane 40 within which is formed a progressively enlarging opening or slot 42. Flange portion 40 is beveled inwardly at 44 to permit its rearward surface to pass in relatively close proximity to the light sensitive frontal surface of a photosensitive element 46. Photosensitive element 46 is mounted so as to assume an outward orientation permitting it to witness scene illumination. In this orientation, the photosensitive element 46 will be positioned with respect to flange portion 40 such that the amount of scene light which it receives is regulated by the instant area of the tapered slot 42 presented before it at a given time during an exposure cycle. Slot 42 is selectively configured for attenuating light reaching the cell 42 in correspondence with the aperture defining position of blades 14 and 16. With the above photocell scanning arrangement, a control circuit operable with the exposure mechanism may be made responsive to relative aperture and scene light during an exposure sequence.

Coacting aperture blades 14 and 16 are held in the pre-exposure position illustrated by a release latch, a portion of which is depicted at 48. Rotatable latch 48 is configured having a latching tip (not shown) which engages a corresponding slot within the upward surface of aperture blade 14 to retain blades 14 and 16 in a cocked orientation. Latch 48 also is configured having an outstanding tab 50 arranged for cooperative engagement with a loading arm shown at 52. Loading arm 52 is pivotally mounted within the assembly such that when released at the commencement of an exposure cycle it will rotate in a counterclockwise direction to strike the tab 50 of aperture release latch 48 and cause its disenagement with aperture blade 14. The arm 52 is configured to support a resilient blade spring 54 which is attached at a forwardly bent flange portion 56. Spring 54 incorporates a stem portion which is bent upwardly to form a resilient keeper contact member 58. The spring 54 is also formed extending upwardly from its contact with flange 56 to form a second keeper contact member 60.

Loading arm 52 is held prior to the commencement of an exposure cycle in the retracted position illustrated by mechanical engagement with a release button 62. This mechanical linkage is indicated functionally by a dashed line 64.

An exposure cycle is initiated by the manual depression of release button 62. Depression of button 62 will cause the unlatching and release of loading arm 52 for pivotal movement and impact with flange 50 as well as cause the actuation of a power switch $S_1$. Switch $S_1$ is actuated from a downwardly protruding extension 66 of the button 62. The switch is shown to include an electrically insulative base molding portion 68 which supports switch contact leaves 70 and 72. Contact leaf 72 is held away from leaf 70 by virtue of its abutment against extension 66. Movement of extension 66 will permit the contact leaves 70 and 72 to move into circuit completing engagement which, in turn, causes an energization of a control circuit incorporating electromagnet assemblies such as those shown generally at 74 and 76.

With the disengagement of latch 48 from aperture blade 14, blades 14 and 16 will rotate under the bias of spring 32 to define a gradually enlarging aperture opening 22. The blades will continue to open until their movement is arrested either by a stop bar 78 of a follow-focus mechanism depicted generally at 80 or by a brake assembly shown generally at 84.

When the control mechanism 10 is operated under conditions of ambient or steady state illumination, brake assembly 84 selectively halts the opening movement of aperture blades 14 and 16 at a position defining an effective aperture determined from the output signal of a light sensitive circuit. Assembly 84 includes a brake member 85 formed having a lever portion 86. Lever 86 is configured to retain a cylindrically shaped insert 88 formed of a brake-shoe material having a high coefficient of kinetic friction in cooperation with the material from which the blade 16 is formed. Extending from lever portion 86 is a retraction tab 90. Brake member 85 is pivotally mounted upon a supporting bracket 94 and is biased for rotation into contact with aperture blade 16 by a wire spring 92. The aperture brake arrangement 84 is more fully described in a copending application for U.S. Pat., Ser. No. 784,064, filed Dec. 16, 1968, entitled, "Aperture Defining Exposure Control System" by Lawrence M. Douglas.

Brake assembly 84 is selectively caused to assume a brake orientation arresting the movement of the aperture blades or a pre-braking retracted orientation by a change-over arm shown generally at 100. Arm 100 is pivotally secured within the control mechanism and is rotatable about a stud 102. The arm is biased for counterclockwise rotation by a spring 104 wound about stud 102 and retained in position by a retainer ring 106. The transitional side of spring 104 is arranged to abut against a tab 108 depending from the arm 100. Arm 100 is formed having a tip 110 which is selectively engageable with the retraction tab 90 of braking assembly 84. One leg of the change-over arm 100 is configured for pivotally supporting a magnetizable keeper or armature 112 for movement into and away from an abutting position against the pole piece 114 of electromagnet 74. A selective de-energization of electromagnet 74 releases keeper 112 from magnetic engagement with pole piece 114 and thereby permits arm 100 to rotate and cause braking assembly 84 to arrest the movement of aperture blades 14 and 16.

Because ambient light levels are of relatively low level during typical flash mode operation, the control system will not de-energize electromagnet 74 until aperture blades 14 and 16 have defined a maximum aperture opening at 22. The blades, however, are halted in flash operation by a follow-focus assembly 80. Follow-focus assembly 80 and stop bar 78 are shown functionally interconnected by a dashed line 82. Typically, its operation is coupled with a rangefinding mechanism so that stop bar 78 will be positioned to establish an aperture opening 22 in accordance with light anticipated from the flash source. This anticipated light is determined, as discussed above, from the inverse square law of light energy propagation. Control mechanism 10 incorporates a two-bladed shutter arrangement disposed in aligned fashion rearwardly of aperture blades 14 and 16. At the commencement of an exposure interval, a first of these blades, termed the "opening blade" moves to a position causing the unblocking of the optical path along axis 12. Following an appropriately timed interval of exposure, a second blade termed the "closing blade" is released for movement to a position causing a covering of the optical path. An exposure interval is derived as the time elapsed between the opening and closing of the shutter blades and is controlled by the timed release of the closing blade.

The opening blade of the shutter assembly is illustrated at 120 in a blocking position. Blade 120 is configured having a planar, opaque portion extensible over the predetermined aperture 22 within the optical path of the mechanism. The planar face of opening blade 120 also is formed having an annular opening 122 oriented to move into concentric alignment with optical path axis 12 during an exposure initiation period. Rotation is imparted to blade 120 by a spring 124. Blade 120 further is configured having a tab extension 126 formed within its outermost periphery. Tab 126 abuts against a flanged tip portion 128 of change-over arm 100. An exposure interval is initiated with the de-energization of electromagnet 74 which permits change-over arm 100 to rotate, thereby causing its tip 128 to move upwardly out of engagement with tab extension 126 of blade 120. As a result, blade 120 will be permitted to pivot under the bias of spring 124 into an unblocking position.

Mounted coaxially with opening blade 120 is a closing blade 130 shown in an unblocking position. Blade 130 is configured co-radially with the outward edge of blade 120 and is formed having a surface area sufficient to occlude light passing through opening 122 when it is rotated into a blocking position. Rotational bias is imparted to blade 130 from a spring 132.

Closing blade 130 is selectively retained in the unblocking position illustrated by the abutting engagement of a tab 134, formed in its periphery, with arm 136 of a pivotally mounted release latch 138. A second arm portion 140 of latch 138 supports a magnetizable keeper or armature depicted in exploded fashion at 142. Keeper 142 is selectively held in abutment against the pole piece 144 of electromagnet 76. During an exposure interval termination period, electromagnet 76 is de-energized to release keeper 142 from magnetic engagement with pole piece 144. Release of the keeper 142, in turn, permits the movement of arm 136 of latch 138 out of engagement with tab 134 of closing blade 130. Closing blade 130 then will rotate under the force of spring 132 to a position blocking the passage of light through opening 122 of blade 120. The latter blocking position of blade 130 is limited and defined by the engagement of notch 146 with a flange 148 formed within tab extension 126 of opening blade 120. A comprehensive description of the above-described shutter is provided in copending application for U.S. Pat., Ser. No. 837,510, filed June 30, 1969 entitled, "Improved Braking and Sequencing Mechanism" by Lawrence M. Douglas.

Following an exposure cycle, both assemblies of shutter and aperture blades are returned to their initial or pre-exposure positions by a cocking system which includes such elements as a cocking arm 150 and a ram member 152. Cocking arm 150 is formed supporting a push stud 154 which is caused to cam against a flanged edge 156 of aperture blade 14 to rotate both blades 14 and 16 to their latched pre-exposure position. Ram member 152 is urged into engagement with a lower portion of loading arm 52 to pivot the arm in a clockwise direction. Contact with arm 52 is made at the forward edge of an oval point set screw 158. As loading arm 152 is rotated during a cocking maneuver, its keeper contact members 58 and 60 respectively engage keepers 142 and 112 to urge them into abutting contact with adjacent electromagnet pole pieces. Following a latching of arm 52 in pre-exposure position, the ram 152 will return to the position shown permitting the full rotational movement of arm 52 at the commencement of the next exposure. A comprehensive description of a cocking system as abovedescribed is provided in a copending application for U.S. Pat., Ser. No. 837,672, filed June 30, 1969 entitled, "Photographic Exposure Control System With Automatic Cocking Mechanism," by Lawrence M. Douglas.

During operation of the above-described opening and closing shutter blades 120 and 130, predetermined delays will be encountered between the time of de-energization of electromagnets 74 and 76 and the respective reaching by blades 120 and 130 of fully unblocking and fully blocking positions. To insure desired accuracy over the determined exposure interval, the dynamic characteristic of closing blade 130 is adjusted to be equivalent to the opening characteristic of blade 120. This correlation of dynamic characteristics is provided by adjusting the loading force of spring 132. Turning to FIG. 3, the dynamic characteristics of shutter blades 120 and 130 are revealed in a diagram relating the amount of aperture area covered or uncovered during an exposure interval. Note that the shape of the curve during an exposure initiation period following the release of opening blade 120 corresponds with the shape of the curve during an exposure termination period. The exposure termination period commences with the de-energization of electromagnet 76 and release of blade 130 and is completed as the blade moves to its terminal blocking position. The curve of FIG. 3 may also be considered as representative of the instantaneous values of scene light permitted to reach the film plane of a camera throughout an exposure cycle, assuming that only steady state scene illumination is present.

Figure 2:
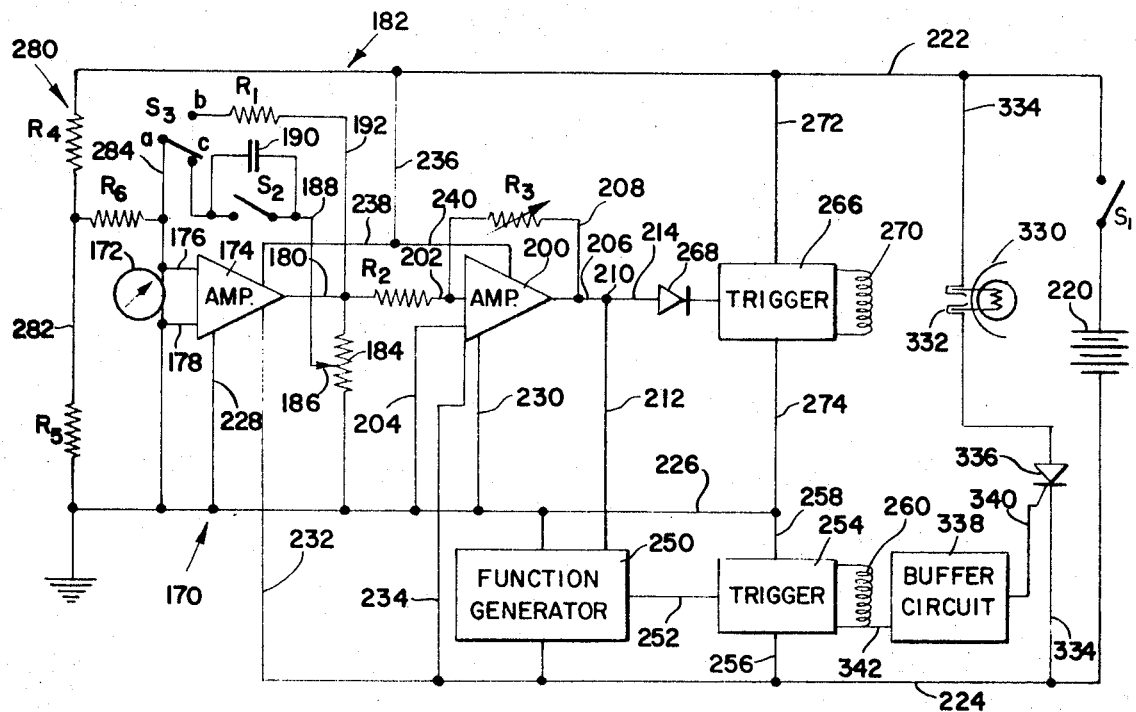
FIG. 2 is a partially schematic diagram of an electrical circuit operable in conjunction with the mechanism of FIG. 1.

A control circuit used with the above-described exposure mechanism is illustrated in FIG. 2. This circuit provides for control of the aperture and shutter mechanism in accordance with a predetermined exposure program, for instance, one in which aperture and exposure interval parameters are related to variations in scene light level values in a proportion of less than one-to-one. A detailed description of the circuit may be found in copending U.S. application for patent, Serial No. 837,688, filed June 30, 1969, entitled, "Exposure Control System," by the present inventor.

The control system evaluates scene light levels with a light sensitive circuit shown generally at 170. Circuit 170 is characterized in combining a photovoltaic cell 172 with a differential amplification stage 174 incorporating select feedback paths. Cell 172 is oriented upon a camera so as to witness scene lighting and is preferably positioned as at 46 in FIG. 1. In this position, the cell cooperates with the earlier described progressively enlarging opening 42 of flange portion or vane 40 formed within aperture blade 14. Accordingly, scene light reaching the cell is altered in synchronism and corresponding variation with an adjustment of aperture size. Cell 172 is coupled with amplification stage 174 through differential input leads 176 and 178. Amplifier 174 is preferably one sometimes referred to in the art as an "operational amplifier." When considered ideally, such amplifiers have infinite gain and infinite input impedance and a zero output impedance. The output of the amplifier 174 is present along line 180 and is coupled to a selective feedback network shown generally at 182. Network 182 provides feedback paths of select impedances first during an aperture regulating mode of operation and then, in an exposure interval timing mode of operation. When operated in the latter mode, the feedback path includes a potentiometer 184 having a wiper arm 186 connected to a feedback line 188. Within line 188 there is inserted a timing capacitor 190 which is selectively shunted by a normally closed switch $S_2$. Potentiometer 184 provides a trimming function for exposure interval timing operations. Feedback line 188 is coupled into the light sensing circuit 170 by joining the terminals $a$ and $c$ of a two position switch $S_3$. With the light sensitive circuit arrangement thus described, photovoltaic cell 172 is permitted to operate in a current mode. As such, it is capable of evaluating the light levels of a scene and producing a current which varies linearly with these levels. Additionally, the circuit 170 is characterized in having a response time sufficient to detect and adequately react to the rise time characteristic of the artificial lighting used during a flash exposure.

When light sensitive circuit 170 is operated in an aperture regulating mode, the contacts of switch $S_3$ are closed between terminals $a$ and $b$ thereby inserting a feedback line 192 across amplification stage 174. Line 192 includes a feedback resistor $R_1$ which operates in conjunction with cell 172 to generate a voltage which is witnessed at output line 180. The activation of switches $S_2$ and $S_3$ in properly timed sequence during an exposure cycle is provided by locating them in the mechanism of FIG. 1 in operative association with change-over arm 100. Such switching arrangements are fully described and illustrated in the above referenced applications for United States patent of Lawrence M. Douglas.

In either mode of operation, the output signal from circuit 170 at line 180 is introduced through a calibrating resistor $R_2$ to a second amplification stage 200. Amplifier 200 may be structured identically with the operational amplifier 174 of the light sensitive circuit 170. Accordingly, it is of a differential variety having input lines 202 and 204 and an output at 206. A feedback path including line 208 and a variable resistor $R_3$ is connected between the output 206 and input line 202 of the amplifier. Variable resistor $R_3$ provides a means for varying the gain of amplifier 200. Accordingly, the resistor $R_3$ may be used to adjust the level of the output signal of circuit 170 in accordance with the sensitometric properties of the film or photosensitive material being used with the exposure control system. Indicia may be provided with the wiper arm of the resistor for indicating proper settings corresponding to a variety of film speeds.

Having been adjusted at the amplification stage 200, the light responsive signal at output 206 is present at a common output terminal 210 to which is coupled parallel output lines 212 and 214.

Power supply to the above-described light sensing circuit 170 and second amplification stage 200 is derived from a d.c. source such as battery 220, the positive and negative terminals of which are coupled respectively to positive and negative bus lines 222 and 224. Electrical energy is supplied into the latter buses by closure of switch $S_1$. An embodiment for switch $S_1$ has been described in connection with FIG. 1. The differential amplification stages 174 and 200 require the presence of a reference level or ground. This ground level is derived along a third bus line shown at 226. Amplification stages 174 and 200 respectively are connected with reference level bus 226 from along lines 228 and 230, to bus 224 from along lines 232 and 234, and to bus 222 from line 236 and its branches 238 and 240.

When the control system is operated in an aperture regulating mode, the output signal at common output terminal 210 represents both the illumination on photovoltaic cell 172 and the relative orientation of aperture blades 14 and 16. This signal is presented from along line 212 to a function generator shown in block form at 250. Generator 250 combines the light responsive output signal at 212 with a signal of select, timed characteristics which have been predetermined for causing the control system to operate in accordance with the above-noted exposure control program. In a preferred embodiment of the system, the function generated is a ramp signal derived from the timed charging of a capacitor. The adjusting ramp signal is characterized in reaching a select level or value in a period of time coincident with the time required for aperture blades 14 and 16 to move from a cocked to a fully open orientation. Function generator 250 is described in detail in the above-referenced application for United States patent of the present inventor.

The adjusted output signal formed within function generator 250 is presented along line 252 to the input terminal of a trigger circuit 254. Circuit 254 may be of a Schmitt-type trigger circuit which has a normally non-conducting transistor stage at its input and an output transistor stage which is normally conducting. The trigger circuit is powered from along lines 256 and 258, connected respectively to buses 224 and 226. When the entire control circuit is energized from battery 220 upon closure of switch $S_1$, the normally conducting output stage of trigger circuit 254 permits current to continuously flow through the winding 260 of electromagnet 74 described in FIG. 1. Such energization derives the requisite magnetic force required to retain keeper 112 in abutment against pole piece 114. When the normally non-conducting stage of trigger circuit 254 receives a signal from line 252 which has reached a predetermined threshold value, its normally conducting stage will be switched to a non-conducting status. As a result, current is diverted from winding 260 and electromagnet 74 is de-energized to permit the rotation of change-over arm 100. Simultaneously with the pivotal movement of change-over arm 100, shutter opening blade 120 is released as a result of the upward movement of tab 126 and feedback network 182 is converted to operation in an exposure timing mode. This conversion is completed with the actuation of switch $S_3$ to a position coupling its terminals $a$ and $c$ and the opening of switch $S_2$ simultaneously with the release of opening blade 120. This switching function may be accomplished by designing the switches to operate in response to the movement of such elements as change-over arm 100 and loading arm 52. A preferred arrangement for the switches is disclosed in the above-referenced copending application for United States patent by the present inventor.

At the commencement of electronic timing of exposure interval, photovoltaic cell 172 has been scanned by opening 42 within vane 40 of aperture blade 14. Accordingly, cell 172 generates an output signal which is responsive both to the earlier selected aperture and to the light levels of the scene being photographed. Similar to its operation in an ambient mode, light sensitive circuit 170 provides an exposure timing output signal at output 180 which is directed through calibrating resistor $R_2$ into amplification stage 200. At stage 200, the gain of the signal is adjusted, as before, in accordance with the sensitometric properties of the photosensitive material being used with the exposure control system.

From the second amplification stage 200, the light responsive signal is directed from common output terminal 210 through line 214 for introduction to a voltage sensitive trigger circuit depicted generally at 266. Inasmuch as trigger circuits 254 and 266 are driven from a single source, means are provided to assure their energization in proper sequence. The sequencing of their operation is achieved by raising the voltage level required for firing trigger circuit 266. This level adjustment is accomplished by the insertion of a diode 268 in path 214. Diode 268 drains off a portion of the voltage signal present in path 214. It is preferred that the diode be of a solid state silicon variety inasmuch as this form requires about one-half a volt threshold signal before assuming a substantially conductive state. The diode further accommodates any signal excursions which may cause the inadvertent firing of the trigger circuit 266.

Somewhat similar to trigger circuit 254, trigger circuit 266 is a Schmitt-type which permits the continuous energization of a winding 270 of electromagnet 76 until the receipt at the input of the trigger of a signal of predetermined level. When energized, winding 270 causes electromagnet 76 to retain keeper 142 in abutting contact with pole piece 144. As a result, latch 138 retains the shutter closing blade 130 in an orientation permitting the passage of light through the exposure aperture.

Trigger circuit 266 is formed having an output stage that is normally conducting to permit the passage of current through winding 270 between buses 222 and 226. Interconnection between the buses is provided by lines 272 and 274. Trigger 266 also includes a normally not conducting stage which responds to the presence of a signal of predetermined threshold value at the trigger input to cause a switching of the normally conducting stage to a non-conducting status. This switching action diverts the flow current through winding 270 thereby de-energizing electromagnet 76 and permitting the release of shutter closing blade 130. Power switch $S_1$ remains closed throughout an exposure cycle by virtue of the continued depression of button 62.

The symmetrical arrangement of trigger circuits 254 and 266 across the power supply 220 permits the establishment of the reference or ground level of bus 226 without the use of a tapped power source. This form of power supply would otherwise be required for the operation of differential amplification stages 174 and 200. The balance of ground level bus 226 between power buses 222 and 224 is maintained as long as the normally conducting stages of the trigger circuits are active or in a conductive state and the windings respectively coupled with them are energized. During an exposure sequence, however, circuit 254 will be triggered before the triggering of circuit 266. Without a form of compensation in the circuit 254, the symmetrical arrangement between buses 222 and 224 will be interrupted and negate the reference level contribution of bus 226. To compensate for the change, an emitter-follower form of compensation may be included with the normally conducting stage of trigger 254.

The performance of operational amplifier 174 can be improved with the insertion of a small biasing current at its input terminals. Such a biasing current is provided through an attenuation network indicated generally at 280. Network 280 includes resistors $R_4$, $R_5$ and $R_6$. Resistors $R_4$ and $R_5$ are coupled on line 282 extending between bus 222 and bus 226. Resistor $R_6$ is coupled from a junction between resistors $R_4$ and $R_5$ to line 284. The resistance values within network 280 are selected to insert a low threshold level bias current into amplification stage 174. This insertion is effective to improve the sensitivity of light sensitive circuit 170.

Referring to FIGS. 3 and 4, the operation of the exposure interval regulating function of the above-described control system is analyzed on a time scale basis. The exposure interval timing operational mode is commenced with the de-energization of electromagnet 74. For purposes of analysis, this instant in the exposure cycle is represented as zero time. Following de-energization, change-over arm 100 will rotate in a counterclockwise direction until its flanged tip 128 moves out of abutting engagement with extension 126 of blade 120. The delay occasioned by this maneuver is shown occupying about 5 milliseconds of time. At this point, the opening blade is released and the opening 122 within blade 120 will move before the preselected aperture and commence to admit scene light to the film plane of a camera. At about 11 milliseconds on the time scale, the period for initiating exposure will be terminated and the shutter will be 100 percent opened. The present control system is analyzed, however, under a convention wherein the shutter is considered to be fully opened at its 50 percent open position and, correspondingly, the shutter is considered to be fully closed when it is 50 percent closed.

Light will continue to be admitted to the film plane until trigger circuit 266 receives a signal from circuit 170 of predetermined threshold magnitude. At such time electromagnet 76 will be de-energized and closing blade 130 will be released for movement into a blocking position. The instant of such de-energization is considered the beginning of an exposure termination period. As suggested earlier, the dynamic equivalence of opening blade 120 and closing blade 130 is apparent from the corresponding opening and closing shapes of the curve of FIG. 3.

To facilitate the description of the present control system, the time scales of FIGS. 4 through 7 are identical to and vertically aligned with the time scale of FIG. 3.

Under conditions of steady state illumination, photovoltaic cell 172 will commence to generate a signal with the opening of switch $S_2$ which removes the shunt across capacitor 190. Because of the constant or steady state condition of scene lighting, the voltage buildup at capacitor 190 will be uniform and may be represented by curve 302 in FIG. 4. The voltage buildup represented at curve 302 commences simultaneously with the release of opening blade 120. This time scale point of commencement represents the beginning of an electronic timing interval. The photographic exposure time interval or interval during which light passes through the aperture commences following a period of time denoted as $t_1$. The cumulative amount of scene light reaching the camera film plane may be represented as a curve 300 measured in meter candle second units or the like. In keeping with convention, curve 300 is shown to commence at a point in time when shutter opening blade 120 is 50 percent open. When the output signal of light sensing circuit 170 reaches the threshold trigger level of trigger 266, electromagnet 76 is de-energized and, simultaneously, the electronic timing interval is terminated. The trigger level of trigger 266 is illustrated as a dashed line in FIG. 4 and its point of intersection with curve 302 is coincident in time with the point at which electromagnet 76 is de-energized. Light will continue to reach the film plane, however, over a period of time represented as $t_2$. Consequently, the photographic exposure interval extends beyond the electronic timing interval. Since the dynamic response of blade 130 is equivalent to that of 120, the delay time $t_1$ is equal to $t_2$ and the photographic exposure interval during which light reaches the film plane is equal to the electronic timing interval. Under conditions of transient or flash illumination, however, this ideal symmetry is not available.

Referring to FIG. 7, the instantaneous amount of light witnessed at the film plane of a camera from a photographic flashbulb source is plotted as a family of curves 304 through 310. Curves 304 through 310 are located within the time scale at a position commonly selected in photographic design. The curves can be characterized as having very irregular but consistent or repeatable shapes. Additionally, their relative amplitudes are variable in correspondence with the distance of the flash source to the subject being photographed. For instance, curve 304 is representative of light witnessed from a subject distance of about 1 meter, while curve 306 is representative of the light witnessed with a 1.4 meter subject distance. A projection of the opening and closing delay periods $t_1$ and $t_2$ over the family of curves 304 to 310 readily illustrates that the symmetry achieved under constant light level conditions is no longer available. Symmetry is disrupted both by the irregular shape of the curves and by the variation of amplitude occasioned by the diminution of light intensity with subject distance.

The instant control system reinserts the desired operational symmetry for flash mode operation by normalizing the otherwise varying output amplitudes of a flash source as evidenced in FIG. 7 and by adjusting the timed position of the flash output characteristic. Normalization of light output is achieved by adjusting one exposure parameter, preferably relative aperture, in correspondence with subject to flash source distance in accordance with the inverse square law of light energy distribution. This feature of the control system has been indicated in FIG. 1 as follow-focus adjust 80. Once normalized, the flash output curve is selectively positioned within the operational time scale of FIGS. 3 through 7.

Referring to FIG. 5, a normalized flash output curve 312 is plotted within a time scale permitting a symmetrical operation of a control system. To so position curve 312, a flashlamp is fired at time zero. Following time zero firing, the lamp requires about 3 milliseconds to bring its ignitor to a temperature sufficient to ignite the foil material surrounding it in the bulb. At about an elapsed time of 5½ milliseconds in the time scale, the flashbulb will commence to generate a significant amount of light. The rapidly increasing light levels at this time are shown in the figure. Superimposing shutter delay periods $t_1$ and $t_2$ described in FIG. 4 upon the curve of FIG. 5 permits an analysis of the light passing through the aperture during the shutter opening and closing periods. The areas under curve 312 and within the delay periods $t_1$ and $t_2$ are indicated respectively at 314 and 316. These areas represent quantities of light analyzed in the curves of FIG. 6. Note that they reside, respectively, under increasing and decreasing light level representations. Because curve 312 is a normalized one, the exposure intervals determined for any flash situation will be substantially identical. Consequently, delay periods $t_1$ and $t_2$ will always be relatively positioned within the exemplary time scale as shown in FIG. 5. The entire light output of a flashlamp as illustrated at curve 312 will be detected by light sensitive circuit 170 as a result of its earlier described very high rate of response. Because of this high responsiveness, a plot of the light witnessed by it can be made to substantially coincide with a curve representing its output voltage signal.

Referring to FIG. 6, a curve is shown at 318 representing integrated light as seen by the photovoltaic cell 172 and the integrated voltage values derived at capacitor 190. Additionally, presented in FIG. 6 is a curve 320 representing the integrated values of light received at a film plane during the same photographic exposure. Curves 318 and 320 are plotted in correspondence with the normalized flash characteristic curve of FIG. 5. Superimposing the time scale position of delay periods $t_1$ and $t_2$ onto curves 318 and 320 reveals that the light witnessed by photocell 172 will rise by an incremental value $l_1$ before the shutter opening blade reaches its half open position. At the half open time scale position, curve 320 begins to rise from a zero light value. As an exposure is terminated over shutter blade delay time $t_2$, curve 320 continues to rise. The extent of this rise is indicated at $l_2$, representing an increment of light equivalent to $l_1$. An equivalence of $l_1$ and $l_2$ represents a desirable symmetry initially evidenced in comparing the areas 314 and 316.

The requisite timed relationship evidenced in FIGS. 3, 5 and 6 for deriving a symmetrical operation of the shutter in a flash mode is provided by causing the initiation of flashbulb ignition simultaneously with the de- energization of electromagnet 74. Returning to FIG. 2, an arrangement for deriving a properly timed flash ignition is described. The circuit of FIG. 2 is shown to include a conventional flashbulb 330 which is insertable within a socket 332 positioned in a line 334 extending between buses 222 and 224. An SCR 336 is inserted in line 334. Flashbulbs 330 will be ignited when switch $S_1$ is closed and SCR 336 is gated into conduction. SCR 336 is controlled from a buffer circuit 338 coupled to the gate of SCR 336 along line 340 and to a point within Schmitt trigger circuit 254 from along line 342. When current flow through the winding 260 is interrupted by trigger 254 during an exposure cycle, a brief pulse of about 250 microsecond duration will be generated. This pulse is applied to buffer circuit 338 from along line 342. Buffer circuit 338, in turn, generates a signal appropriate to gate SCR 336 into conduction. Accordingly, flashbulb 330 will be ignited at a proper instant during the exposure cycle. Buffer circuit 338 is disclosed in detail in a copending application for United States patent entitled, "Flash Synchronization Circuit for Sequential Firing of an Array of Flashbulbs," Ser. No. 844,470, filed July 24, 1969, by John P. Burgarella and Seymour Ellin filed of even date herewith.

The buffer circuit, operating in conjunction with the firing of trigger circuit 254 provides a simple and effective technique for igniting flashbulb 330 in the above-described embodiment. Where flash ignition is required at other points in the exemplary time scale, other techniques for actuating the flash are available. For instance, R-C timing circuits actuated by select components within the control mechanism of FIG. 1 may be used to gate SCR 336. Similarly, multivibrators or the like may function in the place of circuit 338.

Since certain changes may be made in the above exposure control system without departing from the scope of the invention herein involved, it is intended that all matter contained in the above description or shown in the accompanying drawings shall be interpreted as illustrative and not in a limiting sense.

What is claimed is:

1. A photographic exposure control system with automatic adjustment for flash synchronization comprising:
    firing means for controlling the energization of a photographic flashlamp to produce a flash illumination of predetermined dynamic characteristics;
    shutter means for determining the interval during which an exposure aperture is open and having a given opening characteristic during an exposure initiation period and a given closing characteristic during an exposure termination period;
    adjustment means for normalizing the levels of said flash illumination passing through said aperture;
    means for actuating said shutter means and said firing means in a relationship to cause said exposure initiation period to commence following energization of said flashlamp and while said flash illumination is increasing, and for causing said shutter means to commence said exposure termination period in response to said levels of illumination while said flash illumination is decreasing, said periods being so related to the dynamic characteristics of said flash illumination as to substantially equate the quantity of light permitted to pass through said exposure aperture during said initiation period with the quantity of light permitted to pass through said aperture during said termination period.

2. The exposure control system of claim 1 wherein said adjustment means is operative to control said aperture in correspondence with light levels anticipated at a scene.

3. The exposure control system of claim 2 wherein:
    said actuating means includes electromagnetic means energizable for selectively actuating said shutter means; and
    said firing means is configured for responding to energize said flash lamp simultaneously with a change in said energization of said electromagnetic means.

4. The exposure control system of claim 1 wherein said shutter means comprises:
    shutter opening means including at least one element movable between terminal position for defining said exposure initiation period; and
    shutter closing means including at least one element movable between terminal positions for defining said exposure termination period.

5. The exposure control system of claim 4 wherein said shutter closing means is configured and arranged to substantially equate the length of said exposure termination period with the length of said exposure initiation period.

6. An exposure control system for automatically regulating the amount of scene light exposing a photosensitive media during a photographic exposure comprising:
    aperture means for determining an effective aperture representing one exposure parameter;
    firing means for controlling the energization of a photographic flash lamp to produce a flash illumination of predetermined dynamic characteristics representing another exposure parameter;

electrical control circuit means for providing an output signal responsive to the light levels of said scene;

shutter means responsive to said output signal for determining an exposure interval and having a given opening characteristic during an exposure initiation period and a given closing characteristic during an exposure termination period;

control means for regulating at least one said exposure parameter in accordance with the level of light anticipated at said scene to normalize the effect of said artificial light upon said media; and means for actuating said firing means at a time related to the commencement of said initiating period in a manner wherein said exposure initiation period commences following energization of said flash lamp and while said flash illumination is increasing, and wherein said shutter means commences said exposure termination period while said flash illumination is decreasing, said periods being so related to the dynamic characteristics of said flash illumination as to substantially equate the quantity of light entering said aperture during said initiating period with the quantity of light entering said aperture during said exposure termination period.

7. The exposure control system of claim 6 wherein said control means is operative to regulate said aperture means in correspondence with the distance from said flash lamp to a photographic subject to provide said normalization.

8. The exposure control system of claim 6 wherein said shutter means comprises:

shutter opening means including at least one element movable between terminal positions for determining said exposure initiation period; and shutter closing means for determining said exposure termination period.

9. The exposure control system of claim 8 in which:

said control means is operative to regulate said aperture means in correspondence with the level of light anticipated at said scene to provide said normalization; and said shutter closing means is operative to substantially equate the extent of said exposure termination period with the extent of said exposure initiation period.

10. The exposure control system of claim 9 in which said electrical control circuit means includes electromagnetic means energizable at different levels for selectively actuating said shutter opening means.

11. The exposure control system of claim 10 in which said firing means is configured for responding to energize said flash lamp simultaneously with a change in said energization levels of said electromagnetic means.

12. An exposure control system for photographic apparatus comprising:

aperture means for determining a range of effective apertures;

firing means for controlling the energization of a photographic flash lamp to produce a flash illumination of predetermined dynamic characteristics;

follow-focus means for selectively controlling the determination of said effective apertures in accordance with the said predetermined illumination characteristics anticipated at said scene so as to normalize the photographic effects thereof;

electrical control circuit means for providing an output signal responsive to the light levels of said scene;

shutter means for determining an exposure interval through said aperture and having a given opening characteristic during an exposure initiation period and a closing characteristic during an exposure termination period substantially equal to said opening characteristic; and means for actuating said firing means at a time with respect to the commencement of said initiating period to substantially equate the quantity of light from said scene entering said aperture during said initiating period with the quantity of light entering said aperture during said exposure termination period.

13. The exposure control system of claim 12 in which said actuating means is operative to actuate said firing means at a time wherein said flash illumination is increasing when said exposure initiation period commences and wherein said shutter means commences said exposure termination period while said flash illumination is decreasing.

14. The exposure control system of claim 13 in which said electrical control circuit means includes electromagnetic means energizable at different levels for selectively actuating said shutter means.

* * * * *